US010927903B2

(12) United States Patent
Mikasa et al.

(10) Patent No.: US 10,927,903 B2
(45) Date of Patent: Feb. 23, 2021

(54) CLUTCH UNIT

(71) Applicant: SHIROKI CORPORATION, Fujisawa (JP)

(72) Inventors: Kunihiro Mikasa, Fujisawa (JP); Hidehiko Fujioka, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 54 days.

(21) Appl. No.: 16/553,509

(22) Filed: Aug. 28, 2019

(65) Prior Publication Data

US 2020/0096057 A1 Mar. 26, 2020

(30) Foreign Application Priority Data

Sep. 20, 2018 (JP) .............................. JP2018-176059

(51) Int. Cl.
| | |
|---|---|
| *F16D 41/04* | (2006.01) |
| *B60N 2/16* | (2006.01) |
| *F16D 41/066* | (2006.01) |
| *F16D 41/08* | (2006.01) |

(52) U.S. Cl.
CPC ........... *F16D 41/04* (2013.01); *B60N 2/1615* (2013.01); *B60N 2/1685* (2013.01); *B60N 2/167* (2013.01); *F16D 41/066* (2013.01); *F16D 41/088* (2013.01)

(58) Field of Classification Search
None
See application file for complete search history.

(56) References Cited

U.S. PATENT DOCUMENTS

2019/0210490 A1* 7/2019 Sato ..................... B60N 2/10

FOREIGN PATENT DOCUMENTS

| JP | 2017109698 A | * | 6/2017 |
|---|---|---|---|
| JP | 2018-035847 A | | 3/2018 |

* cited by examiner

*Primary Examiner* — Timothy Hannon
(74) *Attorney, Agent, or Firm* — McGinn IP Law Group, PLLC

(57) ABSTRACT

A clutch unit that is used for a vehicle seat includes: a housing, which accommodates at least one of a input-side clutch and a output-side clutch, a first engaging portion, which is rotatable integrally with an output shaft member, and a lock member, which is able to be shifted between a locked state, in which the rotation of the output shaft member relative to the housing is suppressed by the lock member being locked to the first engaging portion, and an unlocked state, in which the rotation of the output shaft member relative to the housing is allowed by releasing the engaging with the first engaging portion, wherein when the lock member is shifted from the locked state to the unlocked state, the lock member is elastically deformed to release the engagement of the lock member and the first engaging portion.

13 Claims, 9 Drawing Sheets

CLUTCH UNIT

CROSS-REFERENCE TO RELATED APPLICATION

This application claims priority from Japanese Patent Application No. 2018-176059 filed on Sep. 20, 2018, the entire subject matter of which is incorporated herein by reference.

TECHNICAL FIELD

The disclosure relates to a clutch unit.

BACKGROUND ART

A clutch unit is known from JP-A-2018-35847 and the like.

SUMMARY

JP-A-2018-35847 discloses a lowering suppression mechanism of a lifter accommodated in a housing in order to suppress from increasing of a size of a clutch unit in an axial direction. In JP-A-2018-35847, a gear member is fitted between teeth formed on the inner periphery of a stationary member and teeth formed on the outer periphery of an input-side clutch inner ring to lock the rotation of the input-side clutch inner ring. In this way, the lowering of the lifter is suppressed when an operation lever is not operated. However, according to the configuration of JP-A-2018-35847, it is necessary to provide a spring member for biasing the gear member in the release direction in order to release the locked state. Therefore, the number of parts increases.

The disclosure provides the clutch unit having the lock function with a small number of parts.

A clutch unit of this disclosure is used for a vehicle seat, and the clutch unit includes: an operation lever, which is rotatable around a rotational axis, an operation member, which is configured to rotate integrally with the operation lever around the rotational axis, an output shaft member, which is rotatable around the rotational axis to output an operation force input to the operation lever to the vehicle seat, an input-side clutch, which is driven by the operation lever and transmits the rotation of the operation lever, an output-side clutch, which transmits a rotational torque of the input-side clutch to the output shaft member and suppress the transmission of the rotational torque from the output shaft member to the input-side clutch, a housing, which accommodates at least one of the input-side clutch and the output-side clutch, a first engaging portion, which is rotatable integrally with the output shaft member, and a lock member, which is able to be shifted between a locked state, in which the rotation of the output shaft member relative to the housing is suppressed by the lock member being locked to the first engaging portion, and an unlocked state, in which the rotation of the output shaft member relative to the housing is allowed by releasing the engaging with the first engaging portion. The first engaging portion and the lock member are accommodated in the housing, and when the lock member is shifted from the locked state to the unlocked state, the lock member is elastically deformed to release the engagement of the lock member and the first engaging portion.

According to the disclosure, the clutch unit having the lock function with a small number of parts is provided.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an example of an embodiment of a clutch unit according to the disclosure will be described with reference to the drawings.

Figure 1:
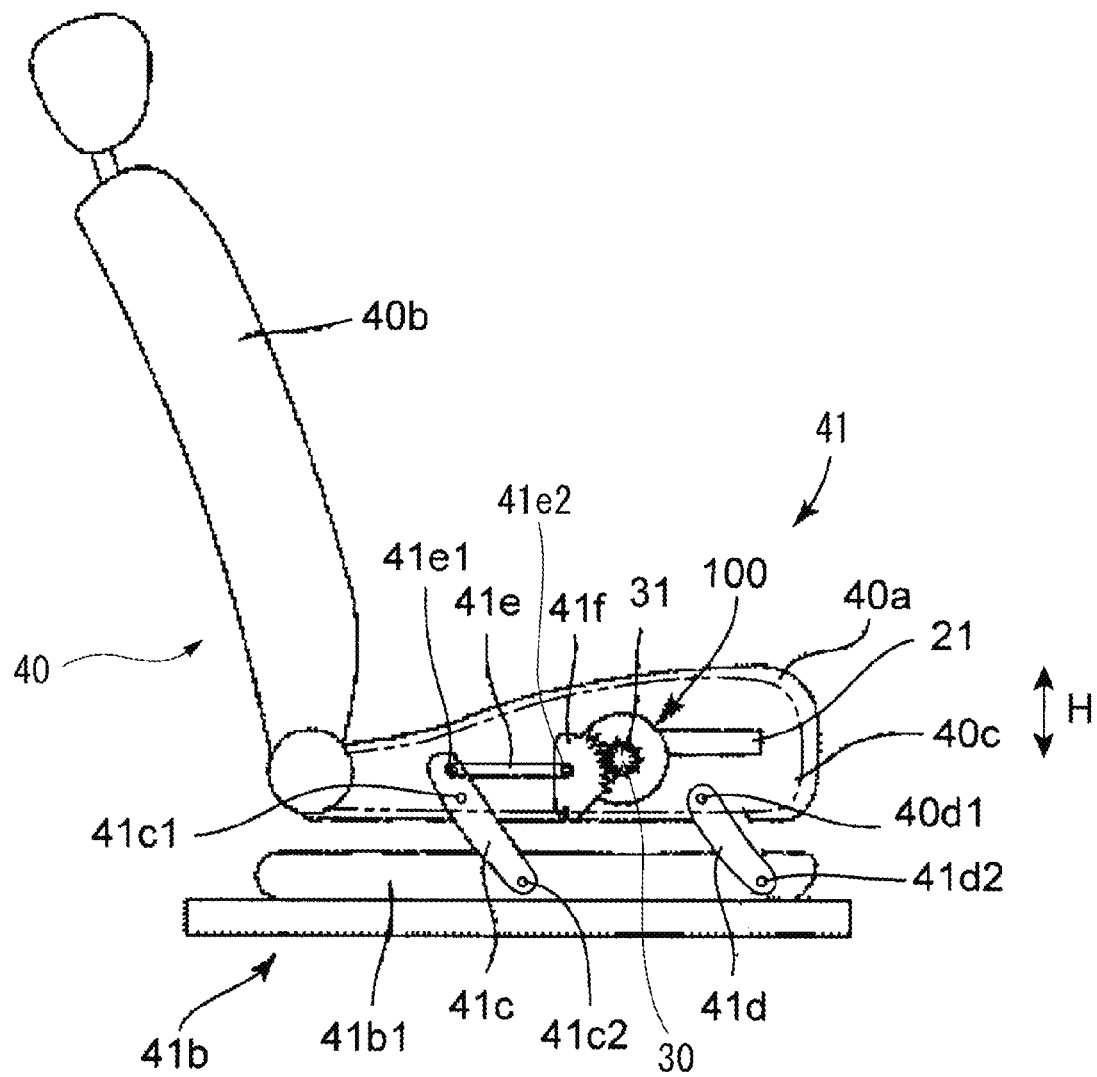
FIG. 1 is a side view showing a state in which a clutch unit according to the present embodiment is applied to a vehicle seat lifter.

FIG. 1 is a side view showing a state in which a clutch unit according to the present embodiment is applied to a vehicle seat lifter. As shown in FIG. 1, a clutch unit 100 according to the present embodiment is used for a vehicle seat 40. The vehicle seat 40 has a seating seat 40*a*, a backrest 40*b*, and a seat frame 40*c*. The clutch unit 100 is fixed to the seat frame 40*c* of the seating seat 40*a*. A vehicle seat lifter 41 is mounted on the vehicle seat 40. The vehicle seat lifter 41 includes the clutch unit 100.

The vehicle seat lifter 41 includes a sector gear 41f and a link mechanism. The clutch unit 100 includes an operation lever 21 that is rotationally operated forward and reverse. A pinion gear 31 integral with an output shaft member 30 that is rotationally driven forward and reverse by the operation lever 21 meshes with the sector gear 41f of the vehicle seat lifter 41.

The link mechanism includes a first link member 41*c* extending substantially in an upper-and-lower direction, a second link member 41*d* extending substantially in the upper-and-lower direction, and a third link member 41*e* extending substantially in a lateral direction.

An upper portion of the first link member 41*c* and an upper portion of the second link member 41*d* are rotatably connected to the seat frame 40*c* by shaft members 41*c*1, 41*d*1, respectively. A lower portion of the first link member 41*c* and a lower portion of the second link member 41*d* are rotatably connected to a slidable member 41*b*1 of a seat slide adjuster 41*b* by shaft member 41*c*2, 41*d*2, respectively.

One end of the third link member 41*e* is connected to the first link member 41*c* by a shaft member 41*e*1 above the shaft member 41*c*1. The other end of the third link member 41*e* is rotatably connected to the sector gear 41f by a shaft member 41*e*2.

In FIG. 1, when the operation lever 21 rotates in the counterclockwise direction (upward), an input torque (rotational force) in a rotational direction of the operation lever 21 is transmitted to the pinion gear 31, so that the pinion gear 31 rotates in the counterclockwise direction. Then, the sector gear 41f meshed with the pinion gear 31 rotates in the clockwise direction, and the third link member 41e pulls the upper portion of the first link member 41c upward. As a result, the first link member 41c and the second link member 41d stand together, so that a seating surface of the seating seat 40a becomes high. When a force input to the operation lever 21 is released after a height H of the seating seat 40a is adjusted, the operation lever 21 rotates in the clockwise direction and returns to its original position (referred to as a neutral position or a neutral state in the following description).

Further, an operation opposite to the above operation lowers the seating surface of the seating seat 40a when the operation lever 21 rotates in the clockwise direction (downward). Further, when the operation lever 21 is released after adjusting the height, the operation lever 21 rotates in the counterclockwise direction and returns to its original position (the neutral position or the neutral state). Further, in a state where the operation lever 21 is released, the clutch unit 100 applies a brake to the rotation of the output shaft member 30 (the pinion gear 31). Therefore, the movement in the upper-and-lower direction of the seating seat 40a is suppressed even when a force in the upper-and-lower direction is applied to the seating seat 40a.

<Clutch Unit>

Subsequently, the clutch unit 100 according to the present embodiment will be described. The components of the clutch unit 100 described below are basically made of metal unless otherwise specified.

Figure 2:
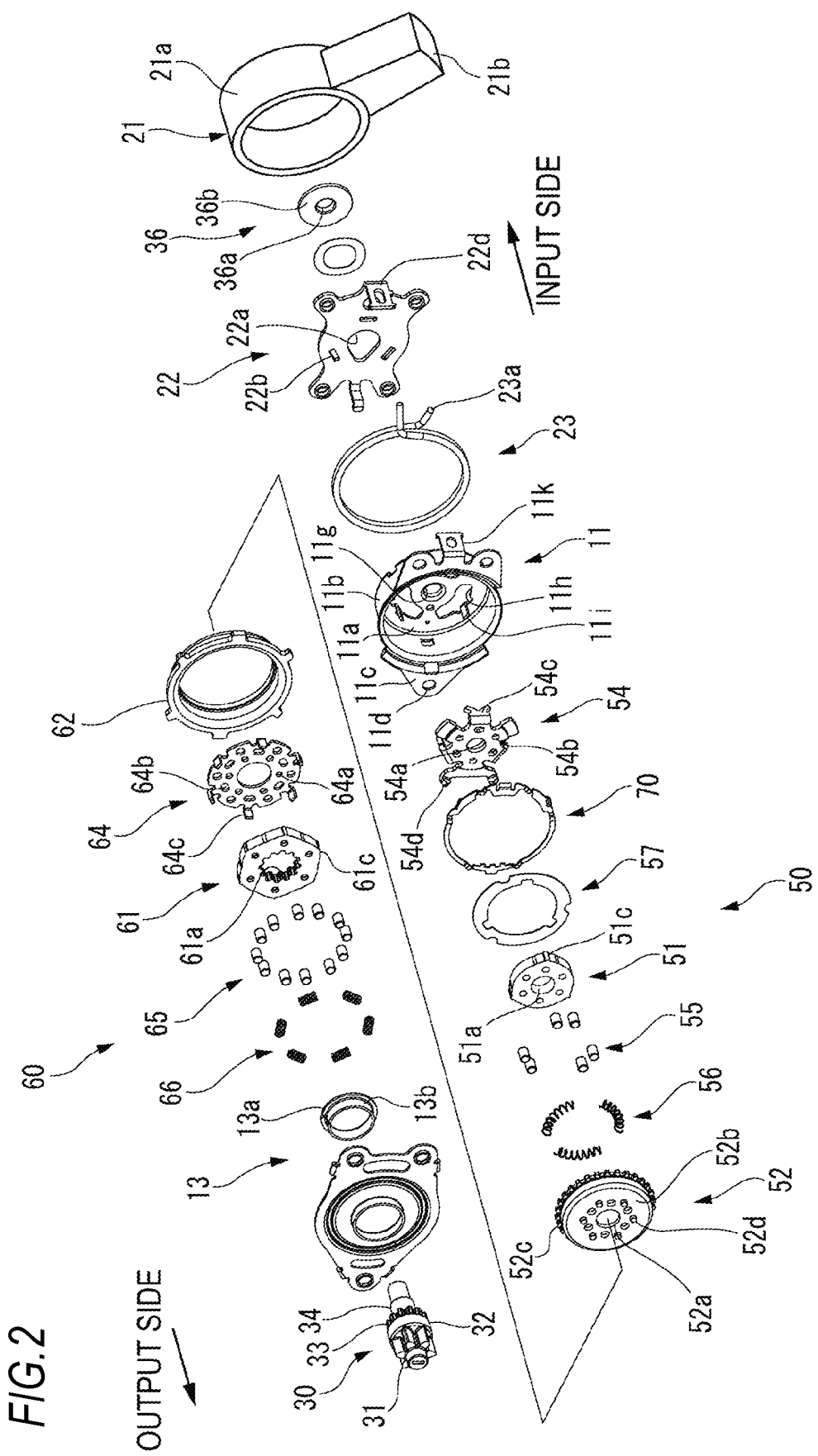
FIG. 2 is an exploded perspective view of the clutch unit.

FIG. 2 is an exploded perspective view of the clutch unit 100. As shown in FIG. 2, the clutch unit 100 includes the operation lever 21, the output shaft member 30, an input-side clutch 50, an output-side clutch 60, and a housing 11.

The input-side clutch 50 is driven (actuated) by the operation lever 21 to transmit the rotation of the operation lever 21 to the output shaft member 30. The output-side clutch 60 suppresses the rotation of the output shaft member 30 even when a force in the upper-and-lower direction is applied to the seating seat 40a. The input-side clutch 50 and the output-side clutch 60 are accommodated in the housing 11. The housing 11 is a member which does not rotate when the operation lever 21 is operated.

The output shaft member 30 is a shaft member extending from the lower left to the upper right in FIG. 2. The output shaft member 30 is rotatable about a rotational axis extending from the lower left to the upper right in FIG. 2. In the following description, the "rotational axis direction" means the direction in which the output shaft member 30 extends. As shown in FIG. 2, the output shaft member 30 penetrates the output-side clutch 60 and the input-side clutch 50 in this order from the left to the right in FIG. 2. In the following description, the lower left side in FIG. 2 may be called the output side, and the upper right side in FIG. 2 may be called the input side. Further, unless otherwise specified in the following description, the circumferential direction and the radial direction are defined around this rotational axis.

On the output shaft member 30, the pinion gear 31, a large-diameter cylindrical portion 32, a spline portion 33, and a small-diameter cylindrical portion 34 are provided in this order from the output side to the input side.

The pinion gear 31 is provided at the output-side end of the output shaft member 30. The large-diameter cylindrical portion 32 penetrates a metal bush 13 fixed to an output-side outer ring member 62 of the output-side clutch 60 (to be described later). The small-diameter cylindrical portion 34 penetrates the housing 11 and an input-side inner ring member 51 and an input-side outer ring member 52 of the input-side clutch 50 (to be described later). The spline portion 33 is splined to an output-side inner ring member 62 of the output-side clutch 60 (to be described later).

A stopper ring 36 is attached to the small-diameter cylindrical portion 34 of the output shaft member 30. The stopper ring 36 has a cylindrical fitting portion 36a and a disc-shaped flange portion 36b located closer to the output side than the fitting portion 36a. The small-diameter cylindrical portion 34 of the output shaft member 30 is fitted into the fitting portion 36a. The flange portion 36b suppresses an operation plate 22 (to be described later), the housing 11, the input-side clutch 50, and the output-side clutch 60 from coming out of the output shaft member 30.

The housing 11 is a cup-shaped (bottomed cylindrical) member and has a bottom surface 11a and a cylindrical portion 11b. Two fixing flanges 11c protruding in the radial direction are formed at the output-side end of the cylindrical portion 11b. A fixing bolt insertion hole 11d is provided in each of the fixing flanges 11c. The housing 11 is fixed to the seat frame 40c by screwing bolts (not shown) inserted into the fixing bolt insertion holes 11d into screw holes of the seat frame 40c. Meanwhile, the housing 11 may be fixed to the seat frame 40c by providing the housing 11 with a caulking portion and caulking the caulking portion to the seat frame 40c.

The housing 11 is provided with a spring lock piece 11k. The spring lock piece 11k extends to the input side.

A cylindrical bearing 11g is formed at a center portion in the radial direction of the bottom surface 11a by a burring process. The bearing 11g extends from the bottom surface 11a toward the input side. The bearing 11g supports the output shaft member 30 to be rotatable with respect to the housing 11. Further, three window portions 11h formed of arc-shaped elongated holes and three protruding pieces 11i extending from edges of the window portions 11h toward the output side are formed on the bottom surface 11a.

The operation lever 21 is formed of, for example, a synthetic resin and is fixed to the operation plate 22 (to be described later). The operation lever 21 has a fixing portion 21a fixed to the operation plate 22 and a rod-like grip portion 21b extending outward in the radial direction from the fixing portion 21a.

The operation plate 22 is provided between the housing 11 and the operation lever 21 in the rotational axis direction. The operation plate 22 rotates forward or reverse integrally with the operation lever 21 when an operator grips the grip portion 21b of the operation lever 21 and rotates the operation lever 21 forward or reverse around the rotational axis.

The operation plate 22 has an insertion hole 22a at the center in the radial direction. The small-diameter cylindrical portion 34 of the output shaft member 30 is inserted through the insertion hole 22a. Further, the operation plate 22 has three rectangular engagement holes 22b around the insertion hole 22a. Claw portions 54c of an operation bracket 54 (to be described later) are inserted into the engagement holes 22b, and the operation lever 21 rotates together with the operation bracket 54 via the operation plate 22.

An operation piece portion 22d is provided on an outer peripheral edge of the operation plate 22. The operation piece portion 22d extends toward the output side.

A return spring 23 is provided on the outer periphery of the housing 11. The return spring 23 is a spring that returns the operation lever 21 and the operation plate 22 to the neutral position when an operational force is not applied to the operation lever 21. The return spring 23 is, for example, a helical spring in which both free ends 23a are close to each other to form an arc shape. The both free ends 23a of the return spring 23 are locked to the spring lock piece 11k of the housing 11 and the operation piece portion 22d of the operation plate 22.

In a state (neutral state) where an operator does not apply an operational force to the operation lever 21, the pair of free ends 23a of the return spring 23 abuts against the spring lock piece 11k and the operation piece portion 22d, and the operation lever 21 is supported at the neutral position. The operation plate 22 rotates together with the operation lever 21 with respect to the housing 11 when an operator rotates the operation lever 21 forward or reverse around the rotational axis. Then, one free end 23a of the pair of free ends 23a is held in engagement with the spring lock piece 11k of the housing 11, and the other free end 23a is engaged with the operation piece portion 22d of the operation plate 22 and moves in a direction away from the one free end 23a against an elastic restoring force of the return spring 23. In this manner, the return spring 23 is deflected to apply a return force to the neutral position.

<Input-Side Clutch>

The input-side clutch 50 includes the input-side inner ring member 51, the input-side outer ring member 52, the operation bracket 54 (an example of the operation member), input-side clutch rollers 55 (an example of the input-side transmission member), input-side roller biasing springs 56, and a lock member 70.

The input-side inner ring member 51 is a cylindrical member extending in the rotational axis direction. The input-side inner ring member 51 has an insertion hole 51a at the center. The small-diameter cylindrical portion 34 of the output shaft member 30 is inserted through the insertion hole 51a. Three wedged cam portions 51c bulging outward are provided at equal intervals on the outer peripheral edge of the input-side inner ring member 51. Three protruding portions (not shown) are formed on the input-side surface of the input-side inner ring member 51.

The operation bracket 54 is a plate-like member. The operation bracket 54 has an insertion hole 54a at the center in the radial direction. The small-diameter cylindrical portion 34 of the output shaft member 30 is inserted through the insertion hole 54a. Further, the operation bracket 54 has three fitting holes 54b into which protruding portions of the input-side inner ring member 51 are fitted. With the fitting structure of the protruding portions 51b of the input-side inner ring member 51 and the fitting holes 54b, the input-side inner ring member 51 and the operation bracket 54 as separate members are connected so as to rotate integrally with each other and to be relatively movable in the rotational axis direction.

Three claw portions 54c are provided on the outer peripheral edge of the operation bracket 54. These claw portions 54c penetrate the window portions 11h formed in the bottom surface 11a of the housing 11 and are fitted into the engagement holes 22b of the operation plate 22. In this manner, the operation bracket 54 is connected to the operation plate 22 and configured to rotate integrally the operation plate 22.

The input-side outer ring member 52 is a dish-like member. The input-side outer ring member 52 has a bottom portion 52b, an outer ring portion 52c, and a fixing portion 52d. The bottom portion 52b is a disk-like portion. An insertion hole 52a is provided at the center in the radial direction of the bottom portion 52b. The small-diameter cylindrical portion 34 of the output shaft member 30 is inserted through the insertion hole 52a. The outer ring portion 52c is a cylindrical portion extending from an outer peripheral portion of the bottom portion 52b to the input side. The bottom portion 52b is provided at the output-side end of the outer ring portion 52c. The fixing portion 52d is configured by protrusions protruding from the bottom portion 52b to the output side. The fixing portion 52d is coupled to a release bracket 64 of the output-side clutch 60 (to be described later). A first engaging portion 52e protruding outward in the radial direction is provided on the entire periphery of the output-side end of the outer ring portion 52c.

Figure 3:
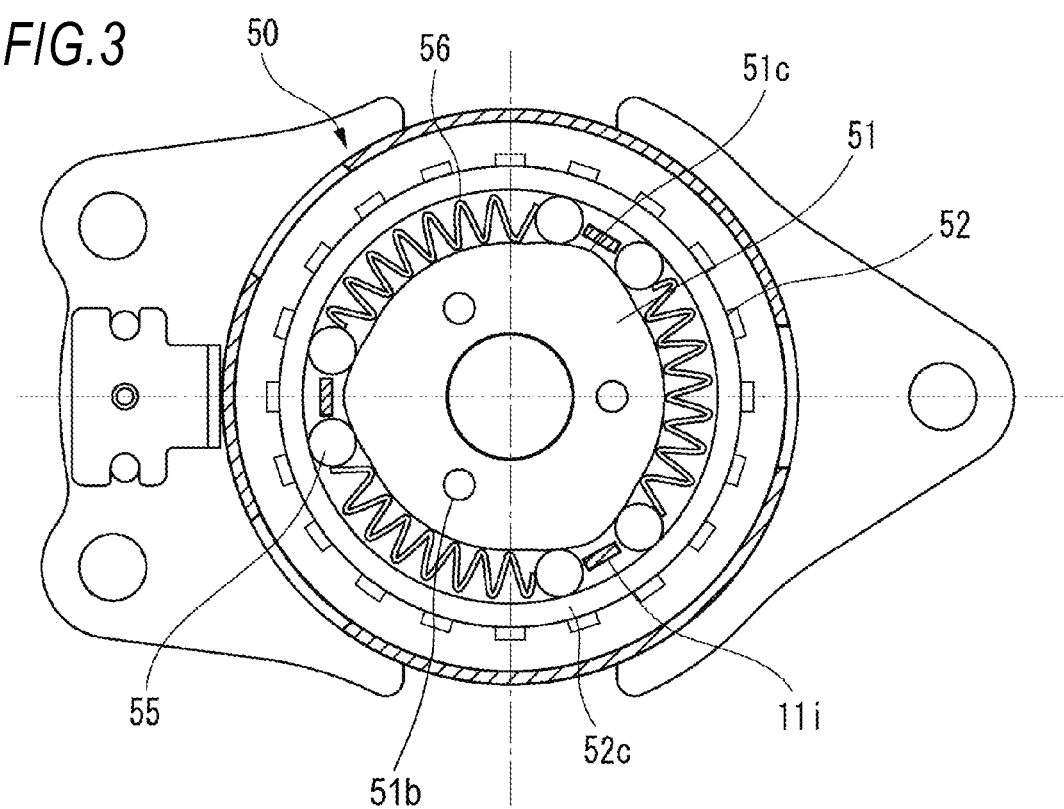
FIG. 3 is a view showing an input-side clutch in a neutral state.

FIG. 3 shows the input-side clutch 50 in the neutral state. Meanwhile, the lock member 70 is not shown in FIG. 3.

As shown in FIG. 3, a gap is provided between an inner peripheral surface of the input-side outer ring member 52 and an outer peripheral surface of the input-side inner ring member 51. The inner peripheral surface of the input-side outer ring member 52 is a circumferential surface, and three wedged cam portion 51c bulging outward are provided on the outer peripheral surface of the input-side inner ring member 51. Therefore, a portion in which both ends in the radial direction are tapered in a wedge shape is formed in the gap between the inner peripheral surface of the input-side outer ring member 52 and the outer peripheral surface of the input-side inner ring member 51. The protruding pieces 11i of the housing 11 protrude into the gap. The protruding pieces 11i regulate the movement of the input-side clutch rollers 55 when the input-side inner ring member 51 is rotated by the operation lever 21.

The input-side clutch 50 includes six input-side clutch rollers 55 and three input-side roller biasing springs 56. The input-side clutch rollers 55 and the input-side roller biasing springs 56 are disposed between the outer peripheral surface of the input-side inner ring member 51 and the inner peripheral surface of the outer ring portion 52c of the input-side outer ring member 52.

The input-side roller biasing springs 56 are disposed between the wedged cam portions 51c of the input-side inner ring member 51 in the circumferential direction. Further, the input-side clutch rollers 55 are disposed in pairs on both sides of the wedged cam portions 51c of the input-side inner ring member 51. The protruding pieces 11i of the housing 11 are disposed between the pair of input-side clutch rollers 55. That is, in the gap between the input-side inner ring member 51 and the input-side outer ring member 52, the input-side roller biasing springs 56, the input-side clutch rollers 55, the protruding pieces 11i, and the input-side clutch rollers 55 are provided in this order in the counterclockwise direction.

[JP0041]

<Operation of Input-Side Clutch>

As shown in FIG. 3, in the input-side clutch 50 in the neutral state, the input-side clutch rollers 55 are in contact with the input-side roller biasing springs 56, and the input-side clutch rollers 55 are biased toward the top of the wedged cam portions 51c by the input-side roller biasing springs 56. Therefore, in the neutral state, the input-side clutch rollers 55 bite into the input-side inner ring member 51 and the input-side outer ring member 52.

In this neutral state, for example, when an operator tries to rotate the operation lever 21 in the counterclockwise direction from the neutral position of the operation lever 21 (the position of the operation lever 21 in no load condition), the rotation of the operation lever 21 is transmitted to the input-side inner ring member 51 via the operation plate 22 and the operation bracket 54. That is, the input-side inner ring member 51 tries to rotate in the counterclockwise direction together with the operation lever 21.

The input-side clutch rollers 55 are provided in a wedged space which is formed between the input-side inner ring member 51 and the input-side outer ring member 52 and narrowed in the clockwise direction. When the input-side inner ring member 51 tries to rotate in the counterclockwise direction, the inner peripheral surface of the input-side inner ring member 51 exerts a force that tends to cause the input-side clutch rollers 55 to bite into the wedged space narrowed in the clockwise direction. Upon receiving such a force, the input-side clutch rollers 55 exert a force on the inner peripheral surface of the input-side outer ring member 52, which has a component for pressing outward in the radial direction and a component for pressing in the counterclockwise direction. The input-side clutch rollers 55 exert a force for pressing the input-side outer ring member 52 in the counterclockwise direction. In this way, when the input-side inner ring member 51 rotates in the counterclockwise direction, the input-side outer ring member 52 rotates in the counterclockwise direction together with the input-side clutch rollers 55.

<Output-Side Clutch>

Returning to FIG. 2, the output-side clutch 60 includes the output-side inner ring member 61, the output-side outer ring member 62, the release bracket 64, output-side clutch rollers 65, and output-side roller biasing springs 66.

The output-side outer ring member 62 is a substantially cylindrical member. The output-side outer ring member 62 is provided coaxially with the output shaft member 30 and is rotatable relative to the output-side inner ring member 61. The output-side outer ring member 62 is disposed on the outer peripheral side of the output-side inner ring member 61.

The output-side inner ring member 61 is provided coaxially with the output shaft member 30 and rotates integrally with the output shaft member 30. The output-side inner ring member 61 is a member having a diameter smaller than that of the output-side outer ring member 62.

A plurality of groove portions is provided on the inner peripheral surface of the output-side inner ring member 61 and formed as a spline portion 61a to which the spline portion 33 of the output shaft member 30 is coupled. Six protruding portions 61b are formed on the input-side surface of the output-side inner ring member 61 (see FIG. 4). Meanwhile, in FIG. 2, a dent, which is a trace when the protruding portions 61b are formed by pressing, is seen on the output-side surface. On the outer peripheral portion of the output-side inner ring member 61, six wedged cam portions 61c bulging outward are formed at equal intervals.

The release bracket 64 is a substantially disc-shaped member and is disposed closer to the input side than the output-side inner ring member 61. The release bracket 64 can transmit the force applied from the input-side clutch 50 to the output-side clutch rollers 65. The outer diameter of the release bracket 64 is larger than the outer diameter of the output-side inner ring member 61 and smaller than the inner diameter of the output-side outer ring member 62. The release bracket 64 is a member separate from the output-side inner ring member 61, the output-side outer ring member 62, the input-side inner ring member 51, and the input-side outer ring member 52.

A plurality of first engagement holes 64a is formed in the release bracket 64. The fixing portion 52d of the input-side outer ring member 52 is inserted into the first engagement holes 64a. In this manner, the release bracket 64 is rotatable together with the input-side outer ring member 52.

The release bracket 64 has a plurality of elongated holes 64b into which the protruding portions 61b (see FIG. 4) protruding to the output side of the output-side inner ring member 61 are inserted. These elongated holes 64b are elongated holes respectively extending in the circumferential direction. The protruding portions 61b are slightly displaceable in the circumferential direction within the elongated holes 64b. That is, the release bracket 64 and the output-side inner ring member 61 are relatively rotatable in a range in which the protruding portions 61b are displaced within the elongated holes 64b.

Six claw portions 64c extending to the output side are provided on the outer peripheral edge of the release bracket 64. The claw portions 64c are provided between the pair of output-side clutch rollers 65, respectively.

Figure 4:
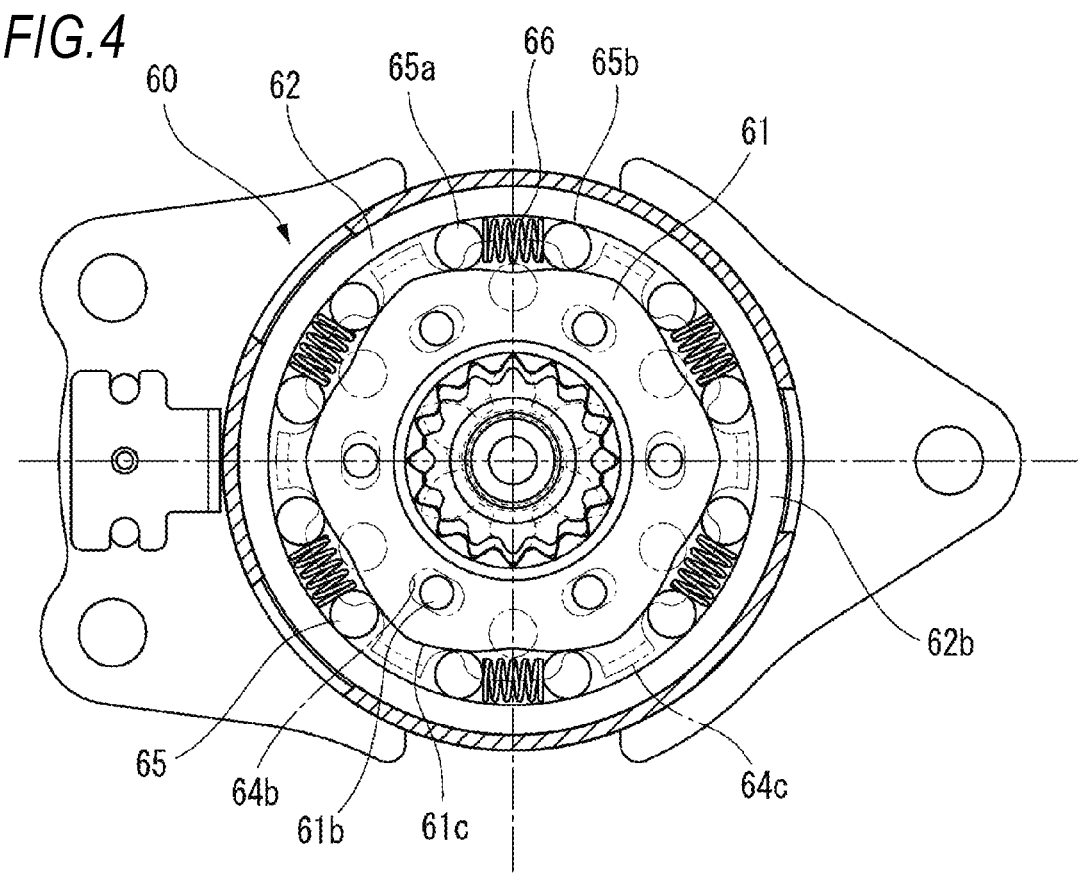
FIG. 4 is a view showing an output-side clutch in the neutral state.

FIG. 4 shows the output-side clutch 60 in the neutral state. As shown in FIG. 4, a gap is provided between the inner peripheral surface of the output-side outer ring member 62 and the outer peripheral surface of the output-side inner ring member 61. The inner peripheral surface of the output-side outer ring member 62 is a circumferential surface, and the wedged cam portions 61c bulging outward are provided on the outer peripheral surface of the output-side inner ring member 61. Therefore, a portion in which both ends in the radial direction are tapered in a wedge shape is formed in the gap between the inner peripheral surface of the output-side outer ring member 62 and the outer peripheral surface of the output-side inner ring member 61. The claw portions 64c of the release bracket 64 protrude into the gap between these portions. The claw portions 64c move inside the gap when the release bracket 64 rotates.

The output-side clutch 60 has twelve output-side clutch rollers 65 and six output-side roller biasing springs 66. The output-side clutch rollers 65 and the output-side roller biasing springs 66 are disposed in the gap between the outer peripheral surface of the output-side inner ring member 61 and the inner peripheral surface of the output-side outer ring member 62. The output-side clutch rollers 65 are members which are disposed between the outer peripheral surface of the output-side inner ring member 61 and the inner peripheral surface of the output-side outer ring member 62 and are capable of transmitting a rotational force between the output-side inner ring member 61 and the output-side outer ring member 62. The output-side clutch rollers 65 are provided so that the input-side surfaces abut against the claw portions 64c of the release bracket 64.

The output-side roller biasing springs 66 are disposed between the wedged cam portions 61c of the output-side inner ring member 61 in the radial direction. Further, the output-side clutch rollers 65 are disposed in pairs on both sides of the wedged cam portions 61c of the output-side inner ring member 61. The claw portions 64c of the release bracket 64 are disposed between the pair of output-side clutch rollers 65. The output-side clutch rollers 65 are biased toward the top of the wedged cam portions 61c by the output-side roller biasing springs 66. In the gap between the output-side inner ring member 61 and the output-side outer ring member 62, the claw portions 64c, the output-side clutch rollers 65, the output-side roller biasing springs 66, and the output-side clutch rollers 65 are provided in this order in the counterclockwise direction.

<Operation of Output-Side Clutch>

FIG. 4 shows the output-side clutch 60 in the neutral state. As shown in FIG. 4, in the output-side clutch 60 in the neutral state, the output-side clutch rollers 65 are biased toward the top of the wedged cam portions 61c by the output-side roller biasing springs 66. In this manner, the output-side clutch rollers 65 bite into the wedged gap between the wedged cam portions 61c of the output-side inner ring member 61 and the inner peripheral surface of the output-side outer ring member 62.

More specifically, the description will be given with reference to first output-side clutch rollers 65*a* and second output-side clutch rollers 65*b* positioned on the counterclockwise side via the first output-side clutch rollers 65*a* and the output-side roller biasing springs 66.

The gap in which the first output-side clutch rollers 65*a* are positioned has a wedge shape tapered toward the counterclockwise direction. The first output-side clutch rollers 65*a* are biased in the counterclockwise direction by the output-side roller biasing springs 66. Therefore, the first output-side clutch rollers 65*a* bite into the output-side inner ring member 61 and the output-side outer ring member 62 in the counterclockwise direction.

The gap in which the second output-side clutch rollers 65*b* are positioned has a wedge shape tapered toward the clockwise direction. The second output-side clutch rollers 65*b* are biased in the clockwise direction by the output-side roller biasing springs 66. Therefore, the second output-side clutch rollers 65*b* bite into the output-side inner ring member 61 and the output-side outer ring member 62 in the clockwise direction.

Here, the output-side outer ring member 62 cannot move with respect to the housing 11. Further, the first output-side clutch rollers 65*a* and the second output-side clutch rollers 65*b* bite into the output-side inner ring member 61 and the output-side outer ring member 62 in the counterclockwise direction and the clockwise direction. Therefore, the output-side inner ring member 61 and the output-side outer ring member 62 cannot rotate. As a result, the output shaft member 30 splined to the output-side inner ring member 61 cannot rotate.

Thus, in the neutral state, the output-side inner ring member 61 and the output-side outer ring member 62 are in a non-rotatable state. Therefore, the output shaft member 30 does not rotate even when a rotational force is applied to the output shaft member 30 from the side of the vehicle seat 40. In this way, the vehicle seat 40 is fixed with its height maintained.

Subsequently, the case where the output-side clutch 60 rotates the output shaft member 30 will be described.

As described above, the input-side outer ring member 52 of the input-side clutch 50 rotates in the counterclockwise direction when the operation lever 21 rotates in the counterclockwise direction. The input-side outer ring member 52 is splined to the release bracket 64. Therefore, when the operation lever 21 rotates in the counterclockwise direction, the release bracket 64 also rotates in the counterclockwise direction.

The release bracket 64 is coupled to the protruding portions 61*b* of the output-side inner ring member 61 via the elongated holes 64*b*. Therefore, the release bracket 64 (1) first rotates in the counterclockwise direction in a state where the output-side inner ring member 61 does not rotate and (2) rotates together with the output-side inner ring member 61 in the counterclockwise direction after the protruding portions 61*b* abut against the edges of the elongated holes 64*b*.

(1) When the release bracket 64 rotates in the counterclockwise direction in a state where the output-side inner ring member 61 does not rotate, the claw portions 64*c* of the release bracket 64 presses the output-side clutch rollers 65 in the counterclockwise direction. Then, the abutment state of the output-side inner ring member 61 and the output-side outer ring member 62 and the output-side clutch rollers 65 which bite into the wedged space disposed between the output-side inner ring member 61 and the output-side outer ring member 62 and narrowed in the clockwise direction is released.

Further, when the output-side inner ring member 61 tries to rotate in the counterclockwise direction, a frictional force is not exerted between the output-side inner ring member 61 and the output-side clutch rollers 65 which bite into the wedged space disposed between the output-side inner ring member 61 and the output-side outer ring member 62 and narrowed in the counterclockwise direction, and the abutment state of the output-side clutch rollers 65 and the output-side inner ring member 61 is released. Thus, the output-side inner ring member 61 is rotatable relative to the output-side outer ring member 62 in a state where the abutment state of the output-side clutch rollers 65 and the output-side inner ring member 61 and the output-side outer ring member 62 is released.

(2) The protruding portions 61*b* of the output-side inner ring member 61 abut against the edges of the elongated holes 64*b* of the release bracket 64 after the output-side inner ring member 61 is in a state where it can rotate relative to the output-side outer ring member 62. Then, the output-side inner ring member 61 rotates together with the release bracket 64 in the counterclockwise direction.

In this manner, the output-side clutch 60 is configured so that it does not rotate the output shaft member 30 in the neutral state and in the state where an operational force is not applied to the operation lever 21 and it rotates the output shaft member 30 only when an operational force is applied to the operation lever 21.

<Lock Member>

As described above, the output-side clutch 60 is configured so that it does not rotate the output shaft member 30 in the state where an operational force is not applied to the operation lever 21. However, due to vibration of a vehicle or the like, the output shaft member 30 may rotate in the state where an operational force is not applied to the operation lever 21. As a result, the vehicle seat 40 may be lowered.

Therefore, the clutch unit 100 according to the present embodiment includes the lock member 70. The lock member 70 is configured to be able to take a locked state in which the rotation of the input-side outer ring member 52 relative to the housing 11 is suppressed and an unlocked state in which the rotation of the input-side outer ring member 52 relative to the housing 11 is allowed. Hereinafter, the lock member 70 will be described in detail.

Figure 5:
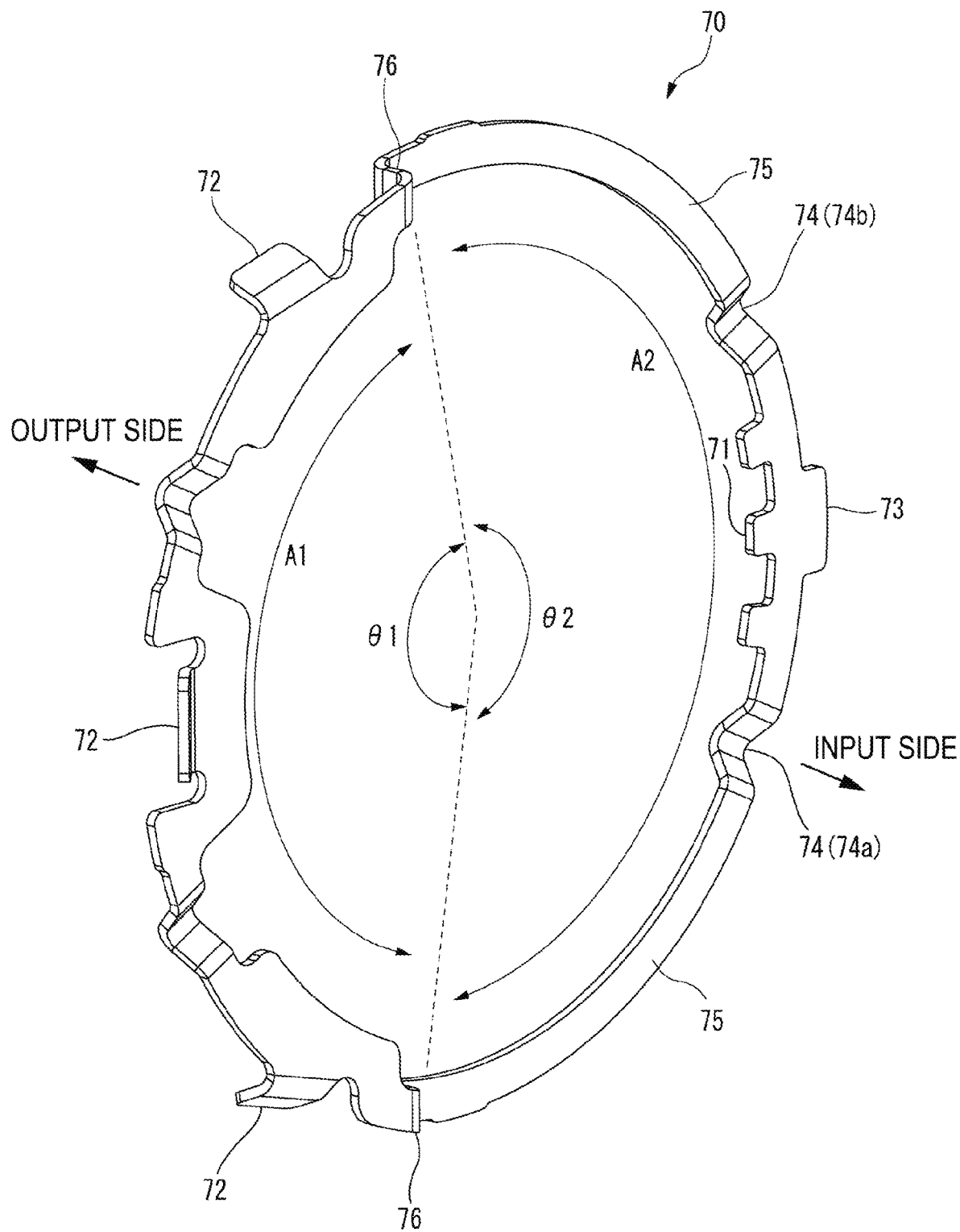
FIG. 5 is a perspective view of a lock member.

FIG. 5 is a perspective view of the lock member 70. As shown in FIG. 5, the lock member 70 is a flat annular member. The lock member 70 is an elastically deformable metal member. The lock member 70 is formed by punching and bending a metal plate. The lock member 70 has a second engaging portion 71, mounting portions 72, a detent portion 73, receiving portions 74, planar portions 75, and connecting portions 76.

The second engaging portion 71 is provided on the inner peripheral edge of the annular lock member 70. The second engaging portion 71 has a plurality of teeth protruding to the inner diameter side. The second engaging portion 71 can be locked to the first engaging portion 52*e* (see FIG. 7) provided on the outer peripheral surface of the input-side outer ring member 52. The second engaging portion 71 has a shape corresponding to the first engaging portion 52*e* of the input-side outer ring member 52. The relative displacement between the input-side outer ring member 52 and the lock member 70 can be suppressed by engaging the second engaging portion 71 to the first engaging portion 52*e*.

Figure 8:
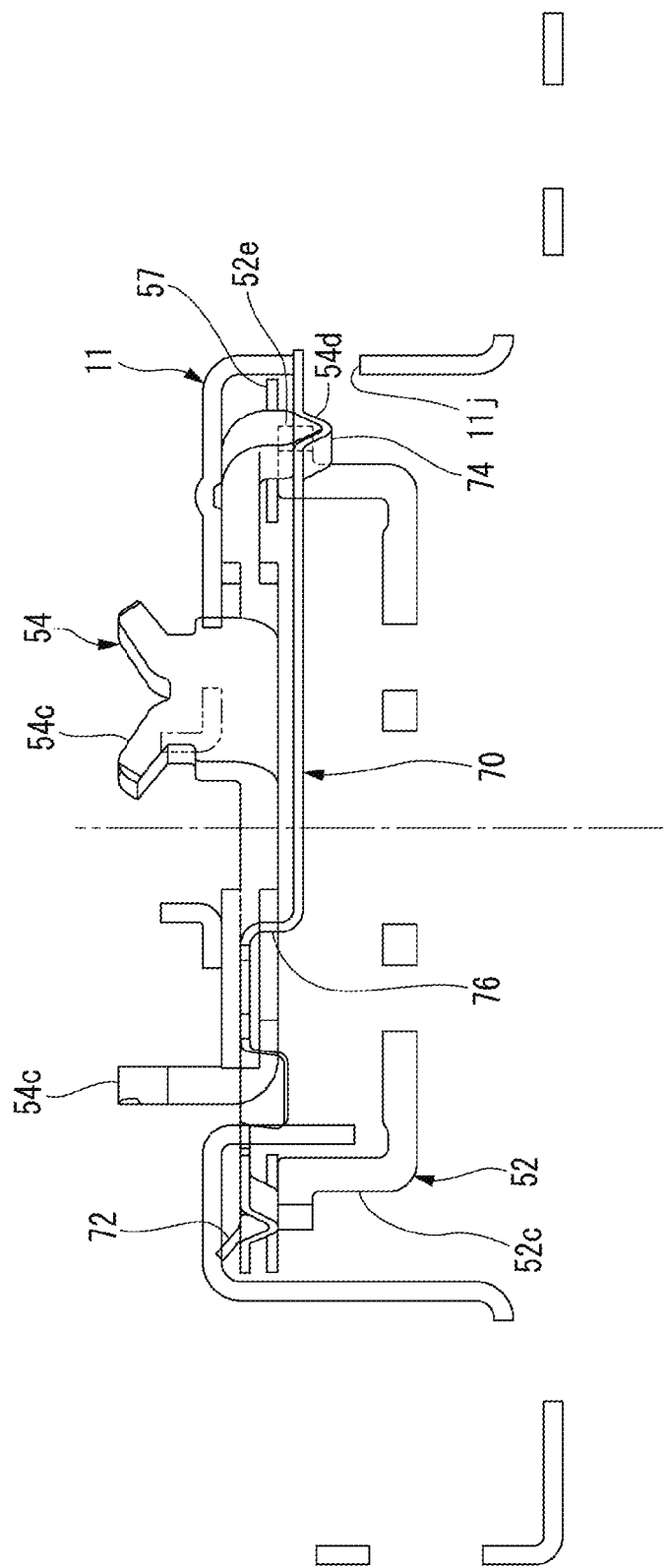
FIG. 8 is a side sectional view showing the input-side clutch in the locked state.

The mounting portions 72 are portions for mounting the lock member 70 to the housing 11. The mounting portions 72 are provided on the outer peripheral edge of the annular lock member 70. The mounting portions 72 have a portion protruding obliquely from the outer peripheral edge of the lock member 70 toward one side in the rotational axis direction and the outer diameter side and a portion protruding obliquely from the outer peripheral edge of the lock member 70 toward the other side in the rotational axis direction and the outer diameter side. As shown in FIG. 8, the lock member 70 is positioned in a predetermined posture in the housing 11 when the mounting portions 72 abut against the inner peripheral surface of the housing 11 and the input-side outer ring member 52. The mounting portions 72 abut against the housing 11 and the input-side outer ring member 52 in a compressed state. The lock member 70 is elastically attached to the housing 11. Therefore, even when vibration is applied to the clutch unit 100, the mounting portions 72 absorb the vibration, and an abnormal noise caused by the abutment of the lock member 70 against the housing 11 is less likely to occur.

On the outer peripheral edge of the lock member 70, the detent portion 73 is provided at the same region in the circumferential direction of the annular lock member 70 as the region in which the second engaging portion 71 is provided. The detent portion 73 protrudes toward the outer diameter side. The detent portion 73 is inserted into a detent hole 11j (see FIG. 7) provided in the housing 11. Even when a force trying to rotate the lock member 70 around the rotational axis is applied, the detent portion 73 abuts against the housing 11 to suppress the rotation of the lock member 70.

The receiving portions 74 are V-shaped grooves provided on the input-side surface of the lock member 70. A pair of receiving portions 74 is provided at positions separated in the circumferential direction. The receiving portions 74 have shapes corresponding to pressing portions 54d of the operation bracket 54 (to be described later). Each of the receiving portions 74 has a pair of inclined surfaces depressed toward the output side and a bottom portion connecting the inclined surfaces.

The planar portions 75 are flat portions provided between the connecting portions 76 and the receiving portions 74. The input-side surface of each planar portion 75 is formed as a smooth flat surface.

The connecting portions 76 are portions extending substantially in the rotational axis direction. The lock member 70 of the present embodiment is circumferentially divided into a hardly-deformable area A1 including three mounting portions 72 and an easily-deformable area A2 including the second engaging portion 71, the detent portion 73, the pair of receiving portions 74 and the pair of planar portions 75. The hardly-deformable area A1 and the easily-deformable area A2 are connected by the connecting portions 76. In this manner, the hardly-deformable area A1 and the easily-deformable area A2 are offset from each other in the rotational axis direction. Meanwhile, the connecting portions 76 may extend in a direction intersecting with the rotational axis direction. In the phrase "the connecting portions 76 extend in the rotational axis direction," the direction in which the connecting portions 76 extend may include a component parallel to the rotational axis.

Figure 6:
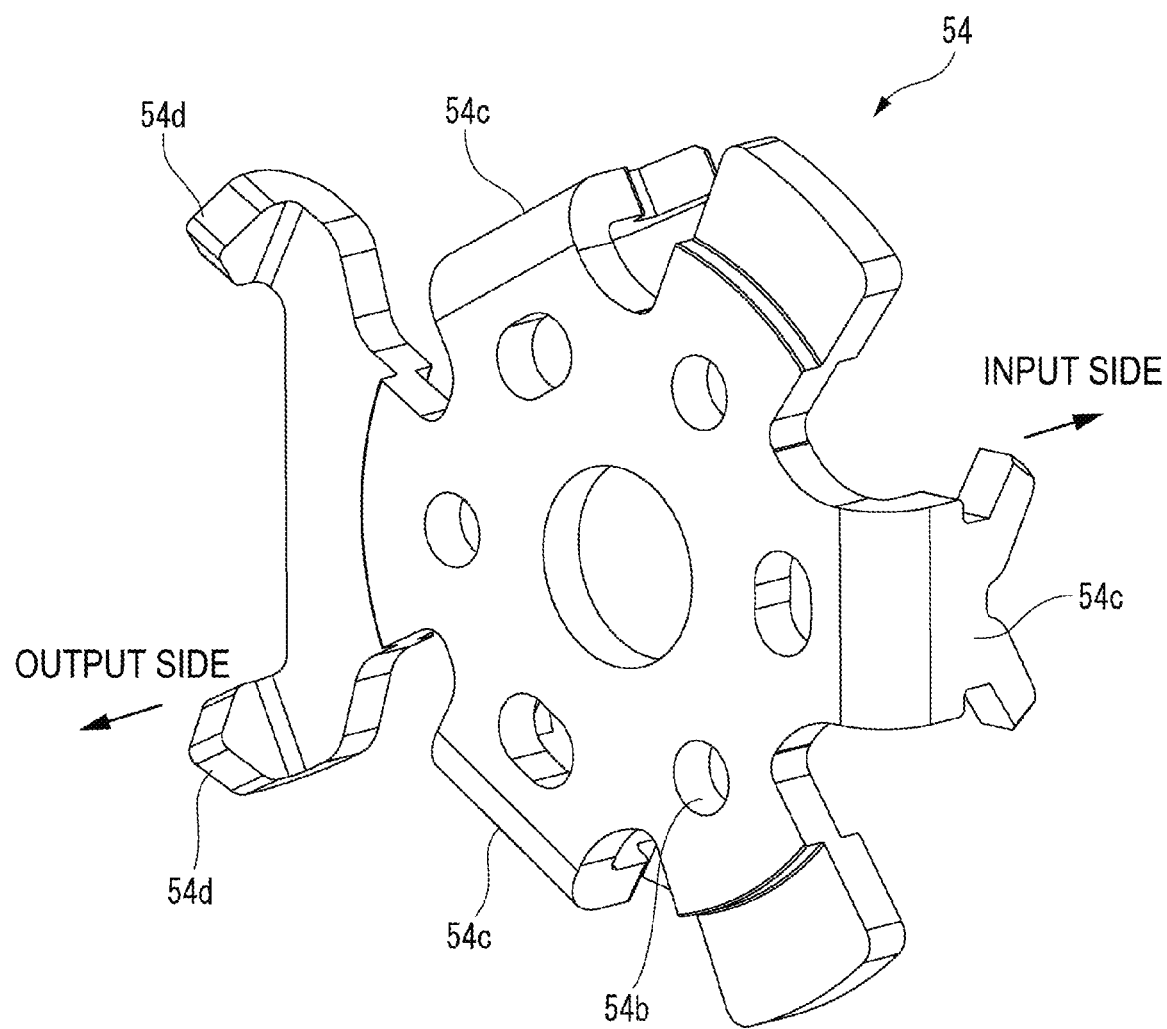
FIG. 6 is a perspective view of an operation bracket.

FIG. 6 is a perspective view of the operation bracket 54. Meanwhile, it should be noted that FIG. 6 is different from FIG. 5 in the viewpoint. FIG. 5 is a perspective view of the lock member 70 as viewed from the input side, and FIG. 6 is a perspective view of the operation bracket 54 as viewed from the output side.

As shown in FIG. 6, a pair of pressing portions 54d protruding to the output side in the rotational axis direction is provided on the operation bracket 54. The pressing portions 54d protrude toward the lock member 70 (see FIG. 2). The tip of each pressing portion 54d has a mountain shape and has a shape corresponding to each receiving portion 74 of the lock member 70.

The clutch unit 100 is not operated when the operation lever 21 is not operated. That is, the output shaft member 30 is not rotated when no force is input to the operation lever 21. The output shaft member 30 is rotated only when the operation lever 21 is operated. As described above, when no force is input to the operation lever 21, the input-side clutch rollers 55 enter the wedged space to suppress the relative displacement between the input-side inner ring member 51 and the input-side outer ring member 52. Therefore, basically, the output shaft member 30 does not rotate.

However, even when no force is input to the operation lever 21, the output shaft member 30 may rotate due to vibration of a vehicle or the like. Therefore, in the present embodiment, the relative rotation between the housing 11 and the input-side outer ring member 52 is suppressed by engaging the lock member 70 to the first engaging portion 52e of the input-side outer ring member 52 when the operation lever 21 is not operated. A state in which the relative rotation between the housing 11 and the input-side outer ring member 52 is suppressed is referred as a locked state, and a state in which the relative rotation between the housing 11 and the input-side outer ring member 52 is allowed is referred as an unlocked state.

Figure 7:
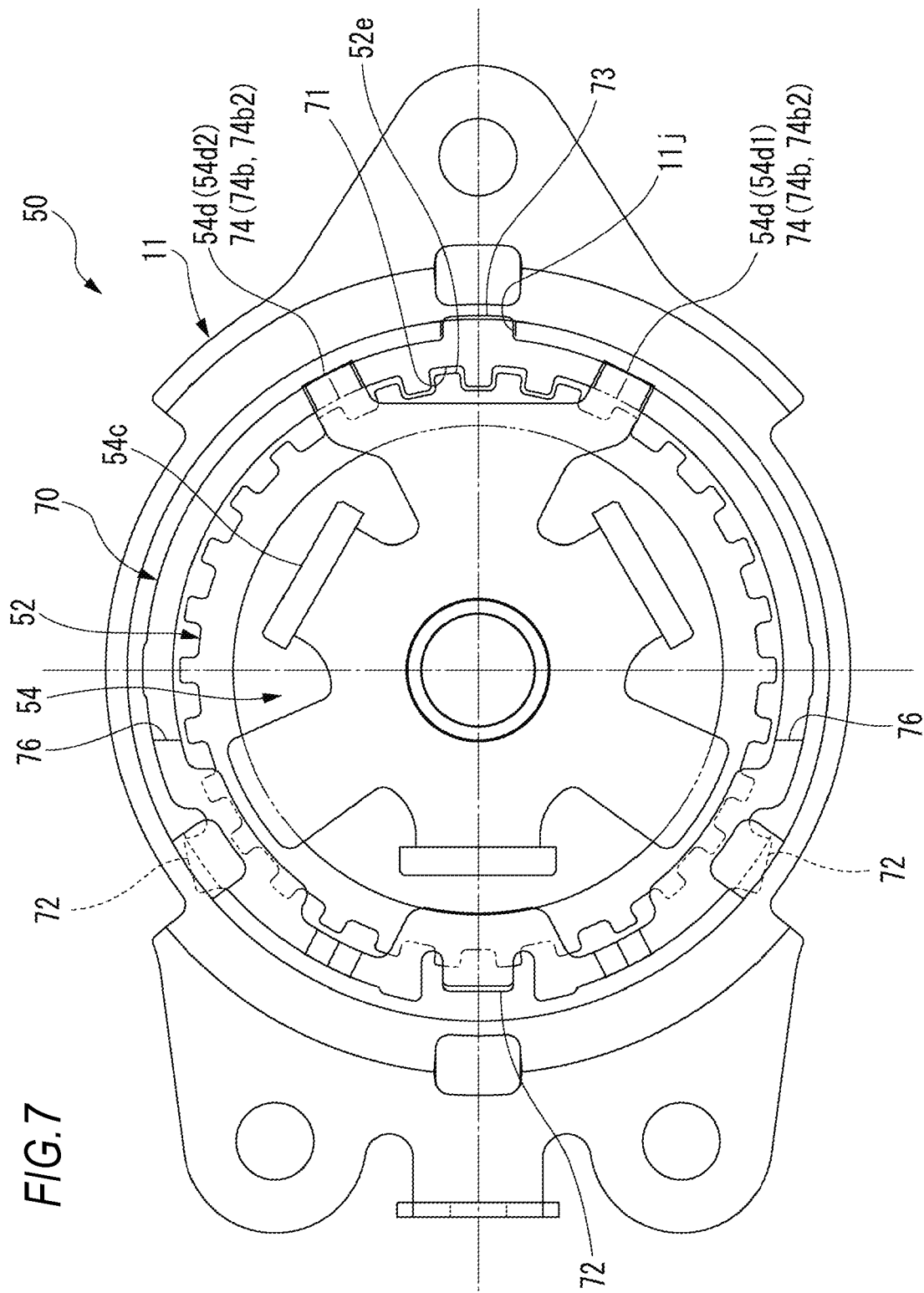
FIG. 7 is a view showing the input-side clutch in a locked state.

The locked state and the unlocked state by the lock member 70 will be described with reference to FIGS. 7 to 10. FIG. 7 is a view showing the input-side clutch 50 in the locked state. FIG. 7 is a view showing the operation bracket 54, the lock member 70 and the input-side outer ring member 52 as viewed through the bottom surface 11a of the housing 11 from the input side in the rotational axis direction. FIG. 8 is a side sectional view of the input-side clutch 50 in the locked state.

FIG. 7 shows the input-side clutch 50 in the locked state. As shown in FIG. 7, the second engaging portion 71 of the lock member 70 is locked to the first engaging portion 52e of the input-side outer ring member 52 in the state where the operation lever 21 is not operated. Further, the detent portion 73 of the lock member 70 is inserted into the detent hole 11j of the housing 11. A force trying to rotate the lock member 70 is applied to the second engaging portion 71 of the lock member 70 via the first engaging portion 52e when the input-side outer ring member 52 tries to rotate. However, even when the lock member 70 tries to rotate, the lock member 70 cannot rotate relative to the housing 11 by the detent portion 73. Therefore, the lock member 70 cannot rotate relative to the housing 11. That is, since the lock member 70 is non-rotatable, the input-side outer ring member 52 is also non-rotatable. In this manner, the lock member 70 suppresses the rotation of the input-side outer ring member 52 relative to the housing 11.

Meanwhile, in no load condition where no external force is applied to the lock member 70, the lock member 70 is in the posture shown in FIG. 8. Further, as shown in FIG. 8, the tips of the pressing portions 54d of the operation bracket 54 in the locked state are fitted to the receiving portions 74 of the lock member 70. Further, the lock member 70 and the first engaging portion 52e locked to the lock member 70 are accommodated inside the housing 11. In this way, since the lock member 70 and the first engaging portion 52e are accommodated inside the housing 11 in which dust is difficult to enter, the reliability of the operation is enhanced.

Figure 9:
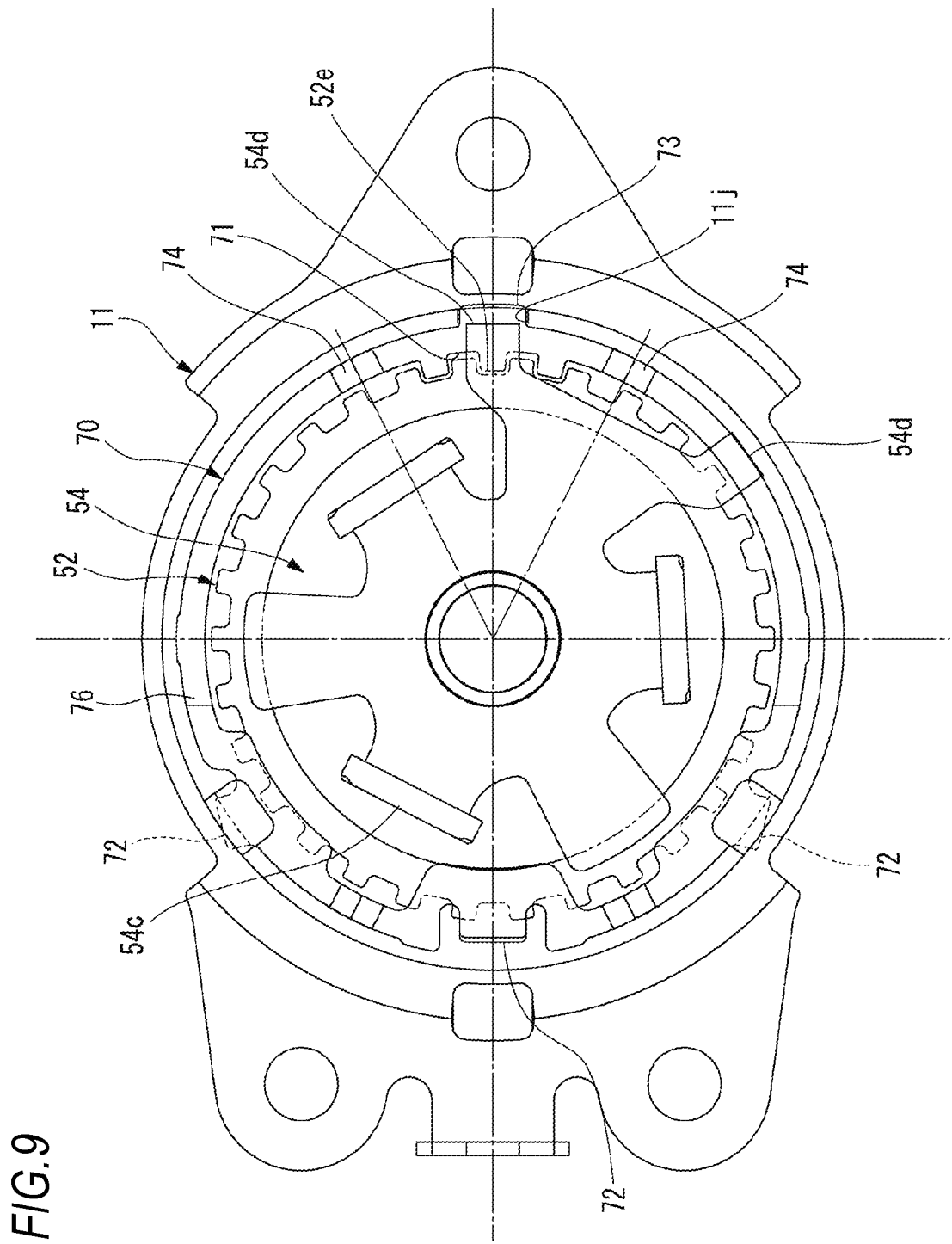
FIG. 9 is a view showing the input-side clutch in an unlocked state.
Figure 10:
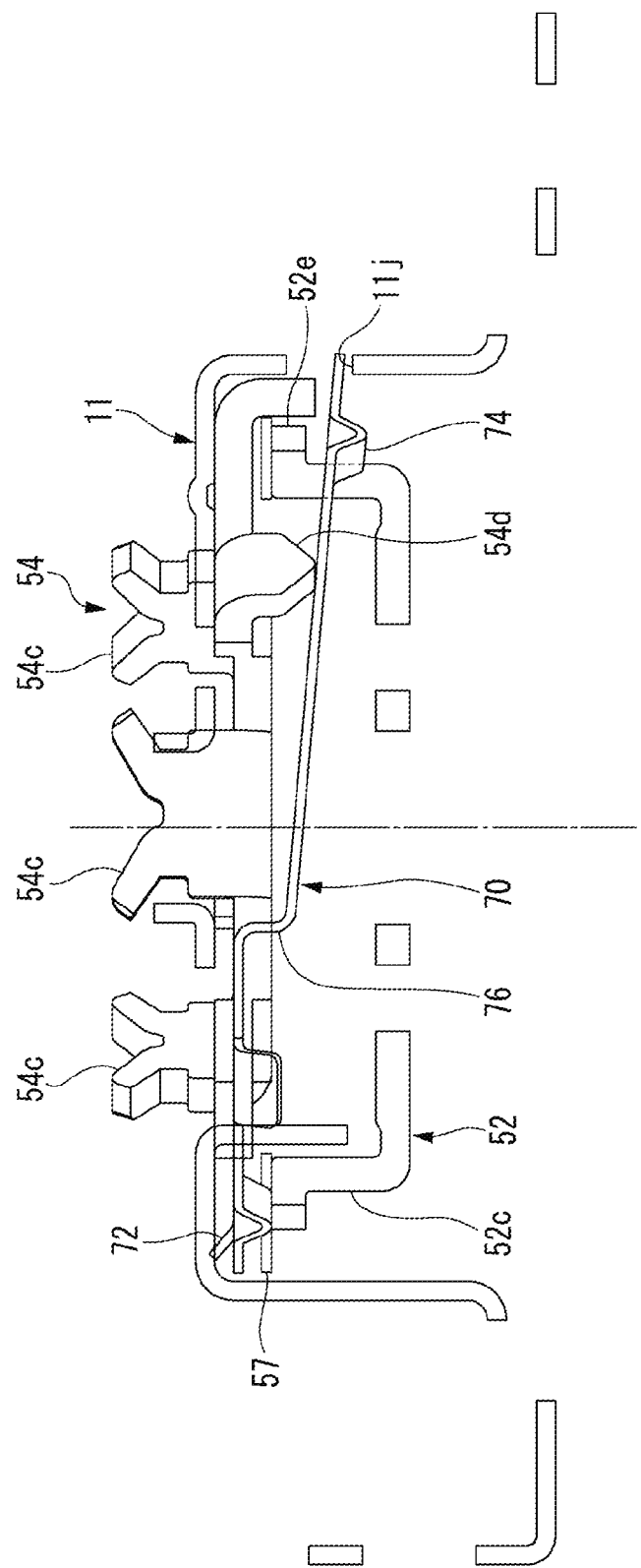
FIG. 10 is a side sectional view showing the input-side clutch in the unlocked state.

FIG. 9 is a view showing the input-side clutch 50 in the unlocked state. FIG. 9 is a view showing the operation bracket 54, the lock member 70 and the input-side outer ring member 52 as viewed through the housing 11 from the input side in the rotational axis direction. FIG. 10 is a side sectional view of the input-side clutch 50 in the unlocked state.

As shown in FIG. 10, when the operation bracket 54 is rotated by operating the operation lever 21, the pressing portions 54d of the operation bracket 54 are shifted from the receiving portions 74 of the lock member 70 in the circumferential direction, and the pressing portions 54d apply a force for pressing the lock member 70 to the output side. Then, the portions of the lock member 70, which are pressed about the mounting portions 72, are elastically bent to the output side. Meanwhile, the dimension of the mounting holes of the housing 11 in the rotational axis direction is set to a size that allows the elastic deformation of the lock member 70. Then, the second engaging portion 71 of the lock member 70 is displaced in the rotational axis direction from its initial state toward the output side, and the engagement of the second engaging portion 71 of the lock member 70 with the first engaging portion 52e of the input-side outer ring member 52 is released. In this manner, the input-side outer ring member 52 is in the unlocked state where it can rotate relative to the housing 11.

Thus, in the clutch unit 100 according to the present embodiment, the lock member 70 is elastically deformed when shifted from the locked state to the unlocked state, so that the engagement of the lock member 70 with the first engaging portion 52e is released. Since the lock member 70 itself can be switched between the locked state and the unlocked state by being elastically deformed in this manner, the clutch unit 100 having the lock function with a smaller number of parts than the configuration of JP-A-2018-35847 can be provided.

Meanwhile, in the above-described description, an example where the first engaging portion 52e is provided on the input-side outer ring member 52 rotating integrally with the output shaft member 30 and separate from the output shaft member 30 has been described. However, the disclosure is not limited to this example. The first engaging portion may be provided on a member integral with the output shaft member and rotating integrally with the output shaft member 30.

Further, in the clutch unit 100 according to the present embodiment, in the locked state, the lock member 70 suppresses the displacement of the first engaging portion 52e around the rotational axis, and the engagement of the lock member 70 to the first engaging portion 52e is released when the lock member 70 is displaced in the rotational axis direction.

In order to maintain the locked state, the lock member 70 is required to be difficult in bending around the rotational axis. On the other hand, the lock member 70 is required to be easy in bending in a engaging direction in order to be locked or unlocked from the first engaging portion 52e. In the present embodiment, the engaging direction is a direction of the rotational axis. That is, since the direction in which the bending is required to be difficult is different from the direction in which the bending is required to be easy, the lock member 70 can be easily configured.

Further, in the clutch unit 100 according to the present embodiment, the lock member 70 is elastically attached to the housing 11.

In the present embodiment, the lock member 70 is elastically attached to the housing 11 via the mounting portions 72 in an elastically compressed state. Therefore, even when vibration is applied to the clutch unit 100, the lock member 70 is less likely to rattle with respect to the housing 11, and an abnormal noise is less likely to occur.

Further, in the clutch unit 100 according to the present embodiment, as shown in FIGS. 8 and 10, the lock member 70 is configured such that an elastic restoring force acts in the direction of shifting the lock member 70 from the unlocked state to the locked state.

The operation lever 21 tries to return to the neutral state by the return spring 23 when an operator releases his hand from the operation lever 21 after operating the operation lever 21. Further, the lock member 70 is in the unlocked state immediately after an operator operates the operation lever 21. At this time, the first engaging portion 52e and the second engaging portion 71 may not be locked.

However, in the clutch unit 100 of the present embodiment, the lock member 70 is configured such that an elastic restoring force acts so as to return the second engaging portion 71 from the state shown in FIG. 10 in which the second engaging portion 71 is bent to the output side in the rotational axis direction to the state shown in FIG. 9. That is, the lock member 70 is configured such that an elastic restoring force acts in the direction of shifting the lock member 70 from the unlocked state to the locked state. Therefore, even when the lock member 70 and the first engaging portion 52e are in the unlocked state immediately after an operator releases his hand from the operation lever 21, the second engaging portion 71 can be locked to the first engaging portion 52e by the elastic restoring force of the lock member 70 itself and rapidly return to the locked state when the operation bracket 54 rotates in the circumferential direction up to a state in which the first engaging portion 52e and the second engaging portion 71 can be locked by the return spring 23.

Further, in the clutch unit 100 according to the present embodiment, as shown in FIG. 8, the input-side clutch 50 includes the input-side inner ring member 51 and the input-side outer ring member 52 which are provided coaxially with the rotational axis and into which the output shaft member 30 is inserted, and the input-side clutch rollers 55 (an example of the input-side transmission member) disposed in the wedged space formed between the outer peripheral surface of the input-side inner ring member 51 and the inner peripheral surface of the input-side outer ring member 52, an annular stop member 57 is provided between the housing 11 and the input-side outer ring member 52 and exerts an elastic restoring force in the direction of separating the housing 11 and the input-side outer ring member 52 from each other, and the lock member 70 is elastically deformed to the side opposite to the stop member 57 in the rotational axis direction.

In the present embodiment, the stop member 57 is provided between the input-side outer ring member 52 and the bottom surface 11a of the housing 11. The stop member 57 exerts an elastic force of separating the input-side outer ring member 52 and the housing 11 from each other in the rotational axis direction. The stop member 57 can be configured by an annular wave washer or the like. The stop member 57 generates a frictional force between the input-side outer ring member 52 and the operation bracket 54 and suppresses the co-rotation of the input-side outer ring member 52 when the operation lever 21 returns to the neutral position by the return spring 23.

The second engaging portion 71 of the lock member 70 is positioned on the side opposite to the stop member 57 in the rotational axis direction and is elastically deformed to the side opposite to the stop member 57. In this way, the interference between the stop member 57 and the lock member 70 that is elastically deformed is suppressed. Further, the lock member 70 is configured to have a diameter larger than that of the annular stop member 57, so that the interference between the stop member 57 and the lock member 70 is further suppressed.

Further, in the clutch unit 100 according to the present embodiment, as shown in FIG. 7, the lock member 70 has an annular shape as viewed from the rotational axis direction, the lock member 70 has a plurality of mounting portions 72 elastically attached to the housing 11, and the plurality of mounting portions 72 are provided separately from each other in the circumferential direction of the annular lock member 70.

Since the plurality of mounting portions 72 are provided along the circumferential direction, the lock member 70 that is bent in the rotational axis direction can be efficiently supported.

Further, in the clutch unit 100 according to the present embodiment, as shown in FIG. 7, the lock member 70 has the second engaging portion 71 capable of being engaged with the first engaging portion 52e, and the second engaging portion 71 is provided only on a part of the lock member 70 in the circumferential direction.

When the second engaging portion 71 is provided over the entire circumferential direction unlike the present embodiment, the second engaging portion 71 is liable to interfere with other members when the lock member 70 is elastically deformed. Further, the first engaging portion 52e is provided on the entire circumference of the input-side outer ring member 52. Therefore, by providing the second engaging portion 71 only on a part of the lock member 70 in the circumferential direction, it is possible to realize a state in which the lock member 70 and the input-side outer ring member 52 can always be locked even when the lock member 70 and the input-side outer ring member 52 relatively rotate.

Further, in the clutch unit 100 according to the present embodiment, as shown in FIG. 8, the mounting portions 72 are offset in the rotational axis direction with respect to the second engaging portion 71.

The mounting portions 72 required to be difficult in bending in the rotational axis direction and the second engaging portion 71 required to be easy in bending in the rotational axis direction are offset in the rotational axis direction. Therefore, the lock member 70 can be easily configured.

Further, in the clutch unit 100 according to the present embodiment, as shown in FIG. 5, the lock member 70 is divided into arc-shaped areas centered on the rotational axis, which have the easily-deformable area A2 and the hardly-deformable area A1 which is less likely to be elastically deformed than the easily-deformable area A2 by an external force in the rotational axis direction, and the second engaging portion 71 is provided in the easily-deformable area A2, and the plurality of mounting portions 72 is provided in the hardly-deformable area A1.

The hardly-deformable area A1 to which the mounting portions 72 required to be difficult in bending belong and the easily-deformable area A2 to which the second engaging portion 71 required to be easy in bending are divided into arc-shaped areas. Therefore, the lock member 70 can be easily configured.

Further, in the clutch unit 100 according to the present embodiment, as shown in FIG. 5, the easily-deformable area A2 and the hardly-deformable area A1 are divided by the connecting portions 76 extending in the rotational axis direction, and the easily-deformable area A2 and the hardly-deformable area A1 are offset from each other in the rotational axis direction.

The hardly-deformable area A1 required to be difficult in bending and the easily-deformable area A2 required to be easy in bending are divided by the connecting portions 76 extending along the rotational axis direction. Therefore, the magnitude of the rigidity of the hardly-deformable area A1 is less likely to affect the easily-deformable area A2, so that the lock member 70 can be configured more easily.

Meanwhile, the phrase "extending in the rotational axis direction" includes "extending in a direction intersecting with the rotational axis direction within an angle of 20 degrees," in addition to "extending parallel to the rotational axis direction."

Further, in the clutch unit 100 according to the present embodiment, as shown in FIG. 5, a circumferential angle $\theta 2$ of the easily-deformable area A2 about the rotational axis is equal to or greater than a circumferential angle $\theta 1$ of the hardly-deformable area A1 about the rotational axis.

When punching a single metal plate in an annular shape to form the lock member 70, the easily-deformable area A2 can be easily bent more easily than the hardly-deformable area A1 by setting the circumferential angle $\theta 2$ of the easily-deformable area A2 to be equal to or greater than the circumferential angle $\theta 1$ of the hardly-deformable area A1. Therefore, the lock member 70 can be configured more easily.

Further, in the clutch unit 100 according to the present embodiment, as shown in FIG. 7, the second engaging portion 71 is provided on the inner peripheral edge of the lock member 70, and the detent portion 73 is provided to protrude in the radial direction on the outer peripheral edge of the lock member 70 corresponding to the second engaging portion 71 and abut against the housing 11 to suppress the relative rotation with the housing 11.

The detent portion 73 is provided in the immediate vicinity of the second engaging portion 71 which receives a force trying to rotate the lock member 70 from the first engaging portion 52e in the locked state. Therefore, even in the vicinity of the first engaging portion 52e required to be easy in bending, the lock member 70 can receive the force trying to rotate the lock member 70 by the detent portion 73 without bending.

Further, in the clutch unit 100 according to the present embodiment, as shown in FIG. 8, a pair of pressing portions 54d protruding toward the lock member 70 in the rotational axis direction is provided on the operation bracket 54 (an example of the operation member), the lock member 70 has, as shown in FIG. 5, the planar portions 75, and a pair of receiving portions 74 which is in contact with the pressing portions 54d in the locked state and is recessed from the planar portions 75 in a direction away from the operation bracket 54.

The operation bracket 54 is configured to switch the lock member 70 between the locked state and the unlocked state by the pair of pressing portions 54d and the pair of receiving portions 74. The lock member 70 can be elastically deformed greatly at a small rotation angle, as compared to the case in which the operation bracket 54 is configured by a single pressing portion 54d and a single receiving portion 74 unlike the present embodiment. This will be described in detail.

In the present embodiment, out of the pair of pressing portions 54d, the pressing portion 54d located on the downstream side in the clockwise direction is referred to as a first pressing portion 54d1, and the pressing portion 54d located on the upstream side in the clockwise direction is referred to as a second pressing portion 54d2. Out of the pair of receiving portions 74, the receiving portion 74 located on the downstream side in the clockwise direction is referred to as a first receiving portion 74a, and the receiving portion 74 located on the upstream side in the clockwise direction is referred to as a second receiving portion 74b.

When the operation bracket 54 is rotated in the clockwise direction in FIG. 7, the first pressing portion 54d1 mainly presses the lock member 70. The lock member 70 is pressed by the first pressing portion 54d1, and in FIG. 10, the right portion of the lock member 70 is deflected to bend downward with the left portion as a fulcrum. The amount of deflection of the lock member 70 increases as the first pressing portion 54d1 moves to the left in FIG. 10. As the operation bracket 54 is rotated in the clockwise direction, the amount of deflection of the lock member 70 increases.

On the other hand, when the operation bracket 54 is rotated in the counterclockwise direction, the second pressing portion 54d2 mainly presses the lock member 70. The lock member 70 is pressed by the second pressing portion 54d2, and in FIG. 10, the right portion of the lock member 70 is deflected to bend downward with the left portion as a fulcrum. The amount of deflection of the lock member 70 increases as the first pressing portion 54d1 moves to the left in FIG. 10. As the operation bracket 54 is rotated in the counterclockwise direction, the amount of deflection of the lock member 70 increases.

By the way, the engaging is preferably released when the operation bracket 54 is rotated in both the clockwise direction and the counterclockwise direction by the same angle. Therefore, preferably, the first pressing portion 54d1 is rotated to the unlocked position when the operation bracket 54 is rotated in the clockwise direction by α degrees from the locked state shown in FIG. 7, and further, the second pressing portion 54d2 is rotated to the unlocked position when the operation bracket 54 is rotated in the counterclockwise direction by α degrees from the locked state shown in FIG. 7.

At this time, when only one pressing portion is provided unlike the present embodiment, the rotation angle of the operation bracket necessary for unengaging is α degrees in both the clockwise direction and the counterclockwise direction.

However, according to the clutch unit 100 of the present embodiment, in the locked state shown in FIG. 7, the first pressing portion 54d1 is already fitted into the receiving portion 74 at a position advanced by β degrees (α>β) in the clockwise direction. Therefore, the engaging can be released when the operation bracket 54 is rotated by α degrees-β degrees in the clockwise direction. Further, in the locked state shown in FIG. 7, the first pressing portion 54d1 is already fitted into the receiving portion 74 at a position advanced by β degrees (α>β) in the counterclockwise direction. Therefore, the engaging can be released when the operation bracket 54 is rotated by α degrees-β degrees in the counterclockwise direction. In this manner, according to the clutch unit 100 of the present embodiment, the engaging can be released with a small amount of rotation of the operation bracket 54.

Further, in the clutch unit 100 according to the present embodiment, the planar portions 75 are formed as smooth surfaces on which leading ends of the pressing portions 54d slide when shifted from the locked state to the unlocked state.

Since the planar portions 75 are formed as the smooth surfaces, the pressing portions 54d of the operation bracket 54 smoothly slide on the planar portions 75 and an operator can operate the operation lever 21 with a light and comfortable feeling of operation. Meanwhile, in the present embodiment, the region between a pair of receiving portions 74 is formed as a smooth flat portion.

Further, in the clutch unit 100 according to the present embodiment, as shown in FIG. 7, the second engaging portion 71 is provided between the pair of receiving portions 74.

Even when the operation bracket 54 is rotated in either direction, the amount of deflection in the rotational axis direction of the region between the portion pressed by the first pressing portion 54d1 and the portion pressed by the second pressing portion 54d2 is so large. The region therebetween includes the region between the first receiving portion 74a and the second receiving portion 74b. When the second engaging portion 71 is provided between the first receiving portion 74a and the second receiving portion 74b, the locked state and the unlocked state can be reliably switched easily.

What is claimed is:
1. A clutch unit that is used for a vehicle seat, comprising:
an operation lever, which is rotatable around a rotational axis,
an operation member, which is configured to rotate integrally with the operation lever around the rotational axis,
an output shaft member, which is rotatable around the rotational axis to output an operation force input to the operation lever to the vehicle seat,
an input-side clutch, which is driven by the operation lever and transmits the rotation of the operation lever,
an output-side clutch, which transmits a rotational torque of the input-side clutch to the output shaft member and suppress the transmission of the rotational torque from the output shaft member to the input-side clutch,
a housing, which accommodates at least one of the input-side clutch and the output-side clutch,
a first engaging portion, which is rotatable integrally with the output shaft member, and
a lock member, which is able to be shifted between a locked state, in which the rotation of the output shaft member relative to the housing is suppressed by the lock member being locked to the first engaging portion, and an unlocked state, in which the rotation of the output shaft member relative to the housing is allowed by releasing the engaging with the first engaging portion,
wherein the first engaging portion and the lock member are accommodated in the housing, and
wherein when the lock member is shifted from the locked state to the unlocked state, the lock member is elastically deformed to release the engagement of the lock member and the first engaging portion.
2. The clutch unit according to claim 1,
wherein, in the locked state, the lock member suppresses the displacement of the first engaging portion around the rotational axis, and wherein when the lock member is displaced in the rotational axis, the engagement of the lock member to the first engaging portion is released.

3. The clutch unit according to claim 1,
wherein the lock member is elastically attached to the housing.

4. The clutch unit according to claim 1,
wherein the lock member is configured such that an elastic restoring force acts in the direction of shifting the lock member from the unlocked state to the locked state.

5. The clutch unit according to claim 1,
wherein the lock member has an annular shape as viewed from the rotational axis direction,
wherein the lock member has a plurality of mounting portions elastically attached to the housing, and
wherein the plurality of mounting portions are provided separately from each other in a circumferential direction of the annular lock member.

6. The clutch unit according to claim 5,
wherein the lock member has a second engaging portion capable of being engaged with the first engaging portion, and
wherein the second engaging portion is provided only on a part of the lock member in the circumferential direction.

7. The clutch unit according to claim 6,
wherein the mounting portions are offset in the rotational axis direction with respect to the second engaging portion.

8. The clutch unit according to claim 6,
wherein the lock member is divided into arc-shaped areas, which are centered on the rotational axis,
wherein the arc-shaped areas have an easily-deformable area and a hardly-deformable area, which is less likely to be elastically deformed than the easily-deformable area by an external force in the rotational axis direction, and
wherein the second engaging portion is provided in the easily-deformable area, and the plurality of mounting portions is provided in the hardly-deformable area.

9. The clutch unit according to claim 8,
wherein the easily-deformable area and the hardly-deformable area are divided by a connecting portion extending in the rotational axis direction, and the easily-deformable area and the hardly-deformable area are offset from each other in the rotational axis direction.

10. The clutch unit according to claim 8,
wherein a circumferential angle of the easily-deformable area about the rotational axis is equal to or greater than a circumferential angle of the hardly-deformable area about the rotational axis.

11. The clutch unit according to claim 6,
wherein the second engaging portion is provided on an inner peripheral edge of the lock member, and
wherein a detent portion is provided to protrude in a radial direction on an outer peripheral edge of the lock member corresponding to the second engaging portion and abut against the housing to suppress the relative rotation with the housing.

12. The clutch unit according to claim 1,
wherein a pair of pressing portions protruding toward the lock member along the rotational axis direction is provided on the operation member, and
wherein the lock member has
a planar portion, and
a pair of receiving portions, which is in contact with the pressing portions in the locked state and is recessed from the planar portion in a direction away from the operation member in the rotational axis.

13. The clutch unit according to claim 12,
wherein the lock member has a second engaging portion capable of being engaged with the first engaging portion, and
wherein the second engaging portion is provided between the pair of receiving portions.

* * * * *